US009195011B2

(12) United States Patent
Seng

(10) Patent No.: US 9,195,011 B2
(45) Date of Patent: Nov. 24, 2015

(54) "SECURED" FIBER OPTIC CONNECTING SYSTEM AND METHOD USING OFFSET FIBER POSITION IN A SINGLE-FIBER CONNECTOR

(75) Inventor: Kheng Hwa Seng, Greer, SC (US)

(73) Assignee: AFL Telecommunications LLC, Spartanburg, SC (US)

(*) Notice: Subject to any disclaimer, the term of this patent is extended or adjusted under 35 U.S.C. 154(b) by 428 days.

(21) Appl. No.: 12/747,089

(22) PCT Filed: Dec. 11, 2009

(86) PCT No.: PCT/US2009/067710
§ 371 (c)(1),
(2), (4) Date: Jun. 9, 2010

(87) PCT Pub. No.: WO2010/068890
PCT Pub. Date: Jun. 17, 2010

(65) Prior Publication Data
US 2011/0044585 A1 Feb. 24, 2011

Related U.S. Application Data

(60) Provisional application No. 61/121,667, filed on Dec. 11, 2008.

(51) Int. Cl.
G02B 6/36 (2006.01)
G02B 6/38 (2006.01)
G02B 6/40 (2006.01)

(52) U.S. Cl.
CPC ............ *G02B 6/3851* (2013.01); *G02B 6/3843* (2013.01); *G02B 6/36* (2013.01); *G02B 6/381* (2013.01); *G02B 6/3833* (2013.01); *G02B 6/3887* (2013.01); *G02B 6/3897* (2013.01); *Y10T 29/49826* (2015.01)

(58) Field of Classification Search
CPC ........ G02B 6/36; G02B 6/381; G02B 6/3887; G02B 6/3897; G02B 6/3833
USPC ........................ 385/53, 59, 70, 78, 79, 60, 67
See application file for complete search history.

(56) References Cited

U.S. PATENT DOCUMENTS

| 4,738,507 A | | 4/1988 | Palmquist | |
|---|---|---|---|---|
| 4,744,629 A | * | 5/1988 | Bertoglio et al. | 385/59 |
| 5,177,557 A | | 1/1993 | Yamane | |
| 5,212,752 A | * | 5/1993 | Stephenson et al. | 385/78 |
| 5,619,604 A | | 4/1997 | Shiflett et al. | |
| 5,633,970 A | * | 5/1997 | Olson et al. | 385/78 |
| 5,682,451 A | * | 10/1997 | Lee et al. | 385/78 |
| 5,692,079 A | | 11/1997 | Iso | |
| 5,727,101 A | * | 3/1998 | Giebel et al. | 385/59 |
| 6,062,739 A | * | 5/2000 | Blake et al. | 385/76 |
| 6,129,865 A | | 10/2000 | Jeong et al. | |

(Continued)

Primary Examiner — Ryan Lepisto
Assistant Examiner — Mary El Shammaa
(74) Attorney, Agent, or Firm — Sughrue Mion, PLLC

(57) ABSTRACT

Provided is a single-fiber connector including a housing; and a single-position ferrule disposed within the housing, the single-position ferrule including a single fiber hole which extends though the housing parallel to a longitudinal center axis of the ferrule and is configured to receive a fiber. The fiber hole is disposed in the ferrule at a fiber position located according to a predetermined distance offset from the longitudinal center axis of the ferrule and a rotation of a predetermined number of degrees around the longitudinal center axis of the ferrule in a predetermined direction.

18 Claims, 5 Drawing Sheets

(56) References Cited

U.S. PATENT DOCUMENTS

| | | | |
|---|---|---|---|
| 6,371,658 B2 * | 4/2002 | Chong | 385/59 |
| 6,416,234 B1 * | 7/2002 | Wach et al. | 385/70 |
| 6,742,936 B1 * | 6/2004 | Knecht et al. | 385/67 |
| 6,744,944 B2 | 6/2004 | Matsuura et al. | |
| 7,018,108 B2 * | 3/2006 | Makhlin et al. | 385/78 |
| 7,566,175 B2 | 7/2009 | Scheibenreif et al. | |
| 2003/0142947 A1 * | 7/2003 | Holman et al. | 385/140 |
| 2003/0215191 A1 * | 11/2003 | Taira et al. | 385/78 |
| 2006/0045428 A1 | 3/2006 | Theuerkorn et al. | |
| 2009/0154884 A1 | 6/2009 | Chen et al. | |

\* cited by examiner

"SECURED" FIBER OPTIC CONNECTING SYSTEM AND METHOD USING OFFSET FIBER POSITION IN A SINGLE-FIBER CONNECTOR

CROSS-REFERENCE TO RELATED APPLICATION

This application claims priority from U.S. Provisional Application 61/121,667, filed on Dec. 11, 2008, the disclosure of which is incorporated herein by reference in its entirety.

BACKGROUND

1. Field

Apparatuses and methods consistent with the exemplary embodiments relate to a security connecting system, and more particularly, to a security connecting system for providing interconnection between a single pair of mating optical fibers.

2. Description of the Related Art

Optical fibers find extensive use for transmission of light for digital communications by modulating light signals to convey data or information. The fibers are fragile and have extremely small diameters. Typically, the optical fibers are coupled to a light transmitting device at one end, and light receiving device at the other end. The ends of the fibers may also be coupled in an end-to-end relationship with other mating fibers. In order to provide reliable coupling and ensure high efficiency in the transfer of light or light signals, it is critical that the ends of the optical fibers be precisely aligned with the ends of other fibers or devices to which they are coupled.

Ferrules are used to provide a mechanically robust mount within a connector for holding optical fibers in a desired position. The ferrule is usually a rigid tube that aligns and protects the stripped end of a fiber. Such ferrules may be made of metal, plastic glass or ceramic. For example, a ferrule can be made by cutting glass tubes of desired thickness and having a hole at the center, extending through the longitudinal axis of the ferrule. Optical fibers are passed through these holes in the ferrules. For example, FIG. 1 illustrates a cross-sectional view of a circular ferrule 100 of a single fiber optical connector having a fiber hole 101 and an optical fiber 102 disposed in the center.

The ferrules are held in a housing or support to place them at a desired position and facilitate proper alignment of optical fibers in a connector.

There is an increasing need for physical security and identification in a network. One method in the related art is to create physical "keying" features on a connector housing to prevent connection into an adapter unless the adapter too has the complementary "keying" feature. For example, a secured connecting system of the related art may use physical barriers to prevent unauthorized insertion of a connector plug into a connector receptacle in an adapter.

Another secured connecting system of the related art may use physical barriers to prevent unauthorized removal of a connector plug that is already connected to the adapter.

In both cases, the secured connecting systems of the related art require different connector housings with different physical barriers to prevent either unauthorized insertion of a connector plug into the receptacle of an adapter or unauthorized removal of a connector plug from the adapter.

Thus, a security connecting system which eliminates the need to create multiple types of connector housings and adapters to establish physical security in connecting system of a network is needed.

SUMMARY

According to an aspect of an exemplary embodiment, there is provided a single-fiber connector including a housing; and a single-position ferrule disposed within the housing, the single-position ferrule including a single fiber hole which extends though the housing parallel to a longitudinal center axis of the ferrule and is configured to receive an optical fiber. The fiber hole is disposed in the ferrule at a fiber position located according to a predetermined distance offset from the longitudinal center axis of the ferrule and a rotation of a predetermined number of degrees around the longitudinal center axis of the ferrule in a predetermined direction.

The predetermined direction can be one of clockwise and counterclockwise.

The housing includes a key and the predetermined direction is relative to the key.

The ferrule of the single-fiber connector may have a cylindrical shape.

The single-fiber connector may also include an optical fiber disposed within the fiber hole.

According to an aspect of another exemplary embodiment, there is provided a single-fiber connector system which includes a first single-fiber connector and a second single-fiber connector.

The first single-fiber connector includes a first housing; and a first single-position ferrule disposed within the first housing, the first single-position ferrule including a first single fiber hole which extends though the first housing parallel to a longitudinal center axis of the first ferrule and is configured to receive a first optical fiber. The first fiber hole is disposed in the first ferrule at a first fiber position located according to a predetermined distance offset from the longitudinal center axis of the first ferrule and a rotation of a predetermined number of degrees around the longitudinal center axis of the first ferrule in a predetermined direction.

The second single-fiber connector includes a second housing; and a second single-position ferrule disposed within the second housing, the second single-position ferrule including a second single fiber hole which extends though the second housing parallel to a longitudinal center axis of the second ferrule and is configured to receive a second optical fiber. The second fiber hole of the second single-fiber connector is disposed in the second ferrule at a second fiber position located to have a mating fiber position which matches in alignment with the first fiber position of the first fiber hole of the first single-fiber connector.

The single-fiber connector system may also include the first optical fiber disposed within the first fiber hole and the second optical fiber disposed within the second fiber hole.

The single-fiber connector system may also include an adapter which includes a first receptacle configured to receive the first single-fiber connector and a second receptacle configured to receive the second single-fiber connector. The first fiber position of the first fiber hole and the second fiber position of the second fiber hole are located such that the first optical fiber and the second optical fiber mate in coaxial alignment with each other to effect an interconnection. Furthermore, the first housing may include a key and the second housing may include a key, and each key of the first housing and the second housing is received by a key hole of the adapter.

The predetermined direction can be one of clockwise and counterclockwise.

The first ferrule and the second ferrule may have a cylindrical shape.

According to an aspect of another exemplary embodiment, there is provided a method of connecting single-fiber connectors in a secure fiber optic network, the method includes selecting a first fiber position for a first fiber hole in a first ferrule of a first single-fiber connector to provide a first optical fiber, the first fiber position being selected relative to a position of a first key of a connector housing of the first single-fiber connector and is located off-center from a center of the first ferrule; selecting a second fiber position in a second ferrule of a second single-fiber connector to provide a second optical fiber, the second fiber position being selected relative to a position of a second key of a connector housing of the second single-fiber connector and is located off-center from a center of the second ferrule; inserting a first optical fiber into the first fiber hole of the first single-fiber connector; and inserting a second optical fiber into the second fiber hole of the second single-fiber connector. The second fiber position has a matching position with the first fiber position when the first ferrule and the second ferrule are aligned in a mating configuration such that the first optical fiber and the second optical fiber are in coaxial alignment with one another.

The first fiber position is located off-center from the center of the first ferrule having a fiber offset from the center of the first ferrule and having a degree of rotation in a predetermined direction relative to the first key.

The first ferrule and the second ferrule both have a substantially cylindrical cross-section.

The method connecting single-fiber connectors may also include inserting the first single-fiber connector into a first receptacle of an adapter; and inserting the second single-fiber connector into a second receptacle of the adapter such that the first optical fiber and the second optical fiber mate in coaxial alignment to effect an interconnection.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
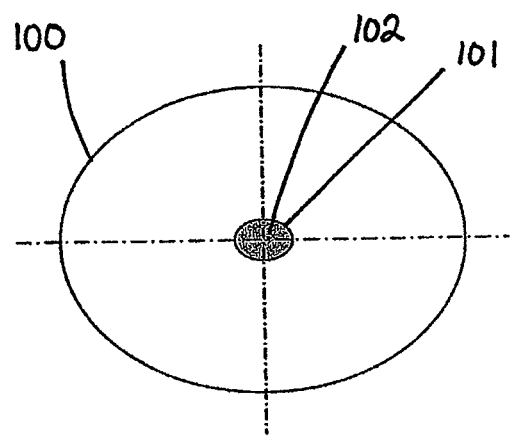
FIG. 1 illustrates a cross-sectional view of a single-position cylindrical ferrule in the related art.

Exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts may be omitted for clarity, and like reference numerals refer to like elements throughout.

According to an exemplary embodiment of the present invention, there is provided a security connecting system for providing interconnection between a single pair of mating optical fibers. The security connecting system uses predetermined positioning of an optical fiber in an off-center position within a ferrule to alter a mating position of the mating optical fibers such that only connectors having a matching mating position can form a proper connection with one another.

For example, two mating connectors are held together on separate sides of an adapter, and will only have physically connecting optical fibers if the fibers on both single-fiber connectors have matching positions with one another. Accordingly, information transferred through the mating pair of optical fibers is secured since an incoming connector to the adapter, that already has a connector on its other end, is prevented from making a physical connection to another optical fiber unless the positioning of the optical fibers within the mating connectors are matched.

Figure 2:
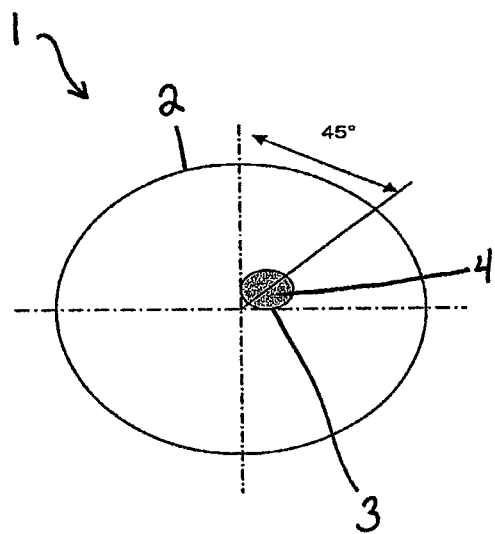
FIG. 2 illustrates a cross-sectional view of a single-position cylindrical ferrule according to an exemplary embodiment of the present invention.

FIG. 2 illustrates a single-position cylindrical ferrule according to an exemplary embodiment of the present invention. In particular, the single position ferrule 1 includes a body 2 and a single fiber hole 3 which extends through the body 2 in a longitudinal direction and is configured to receive an optical fiber 4. The fiber hole 3 is disposed in a position that is offset from the center of the ferrule 1 and rotated 45° in a clockwise direction. Being offset from the center of the cylindrical ferrule 1, the center of fiber hole 1 is placed at a distance away from the center of ferrule 1. The "off-centered" fiber hole 3 extends parallel to a longitudinal center axis of the ferrule 1, extending in the insertion direction of the optical fiber 4. Accordingly, only a connector having a matching fiber position configuration to ferrule 1, including the same amount of fiber offset (i.e., a same distance from the longitudinal center axis of the ferrule 1 and the longitudinal center axis of the fiber hole 3) and a same degree of rotation in a same direction, is able to properly mate with a connector having ferrule 1 to form a secure connection.

Figure 3:
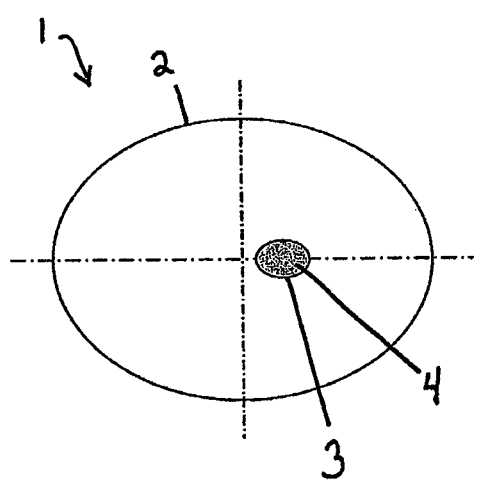
FIG. 3 illustrates a cross-sectional view of a single-position cylindrical ferrule according to another exemplary embodiment of the present invention.

FIG. 3 illustrates a single-position cylindrical ferrule according to another exemplary embodiment of the present invention. In particular, the fiber hole 3 is disposed in a position that is offset from the center and rotated 90° in a clockwise direction.

Figure 4:
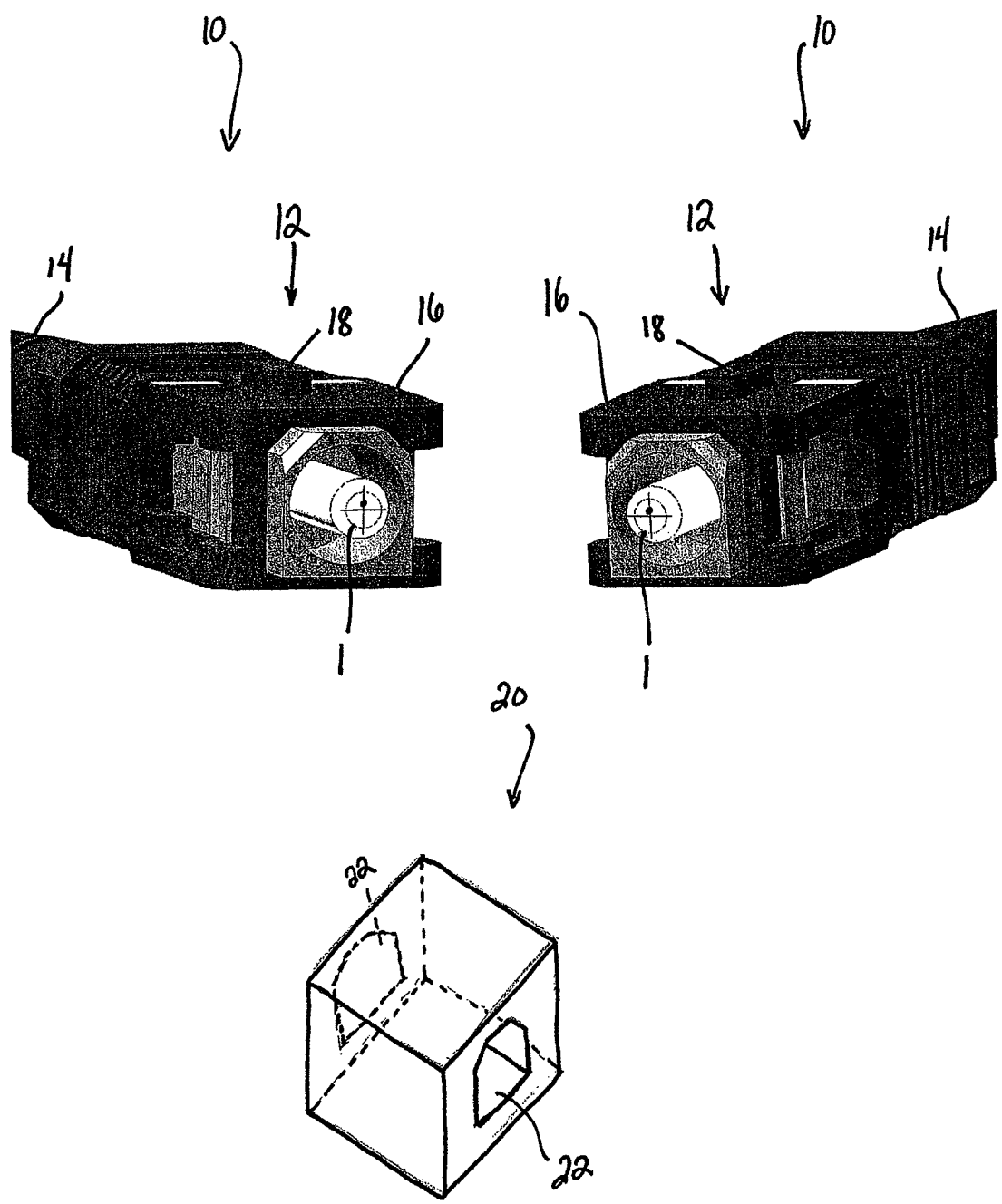
FIG. 4 shows matching fiber positions in a pair of connector plugs according to another exemplary embodiment of the present invention.

FIG. 4 illustrates a connecting system according to an exemplary embodiment of the present invention. In particular, FIG. 4 shows matching fiber positions in a pair of connector plugs, with the keys of both connectors facing up. The connecting system includes two cable assemblies 10 terminated with a single-fiber connector plug 12 on each end section of an optical cable 14. Each connector plug 12 includes a housing 16 and a single-fiber ferrule 1 disposed within the housing 16. The ferrule 1, which may be cylindrical in shape and may be press-fitted to a stainless steel flange, holds an optical fiber 4 in place within fiber hole 3.

The connecting system also includes an adapter 20 which has two receptacles 22 on either side, each receptacle 22 receiving one of the connector plugs 12. Accordingly, a pair of connector plugs 12 are held together by the adapter 20.

The housing 16 includes a key 18 which is pointed in one specific direction when the connector plug 12 is inserted into one of the receptacles 22 of the adapter 20.

From the circular cross section view of the ferrule 1 according to FIGS. 1 and 2, the optical fiber 4 is placed within each fiber hole 3 in a fiber position that is located at a predetermined distance away from the center of the ferrule 1 and is rotated a predetermined number of degrees in a clockwise or anti-clockwise direction.

According to FIG. 4, the fiber holes 3 of the connector plugs 12 are located such that the fiber holes 3 are aligned with one another when inserted into the adapter 20. When the mating position of the fiber holes 3 match in alignment, a proper physical connection is formed between the optical fibers 4 inserted into the fiber holes 4. That is, the optical fibers 4 are in coaxial alignment with each other.

Every rotation of 60° of the fiber hole 3, either clockwise or anti-clockwise, results in a secured connector plug that cannot be mated with another connector plug that does not match in turns of optical fiber position. Accordingly, in a cylindrical ferrule such as ferrule 1, a total of six different secured positions can be obtained by rotating the cylindrical ferrule relative to the key of the connector plug housing.

For example, the six secured positions according to FIG. 2 could be placed at 45°, 105°, 165°, 225°, 285°, and 345°. According to FIG. 3, the six secured positions according could be placed at 90°, 150°, 210°, 270°, 330°, and 30°.

Figure 5:
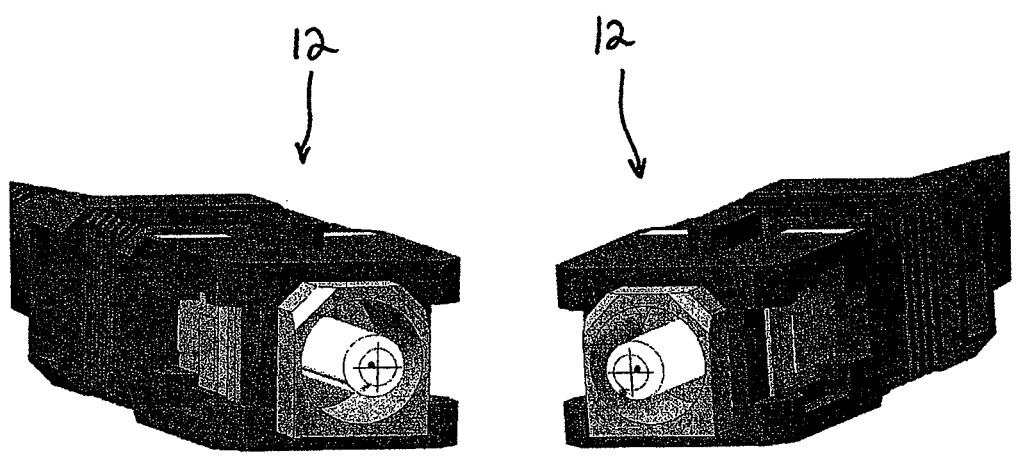
FIG. 5 shows matching fiber positions in a pair of connector plugs according to another exemplary embodiment of the present invention.

FIG. 5 shows matching fiber positions in a pair of connector plugs 12, with the keys of both connectors facing up. As shown in FIG. 5, the optical fibers 4 (see also FIG. 2) of each connector plug 12 are in alignment with each other in a matching configuration. The positions of the optical fibers 4 shown in FIG. 5 have a different fiber position that the optical fibers 4 shown in FIG. 4.

Figure 6:
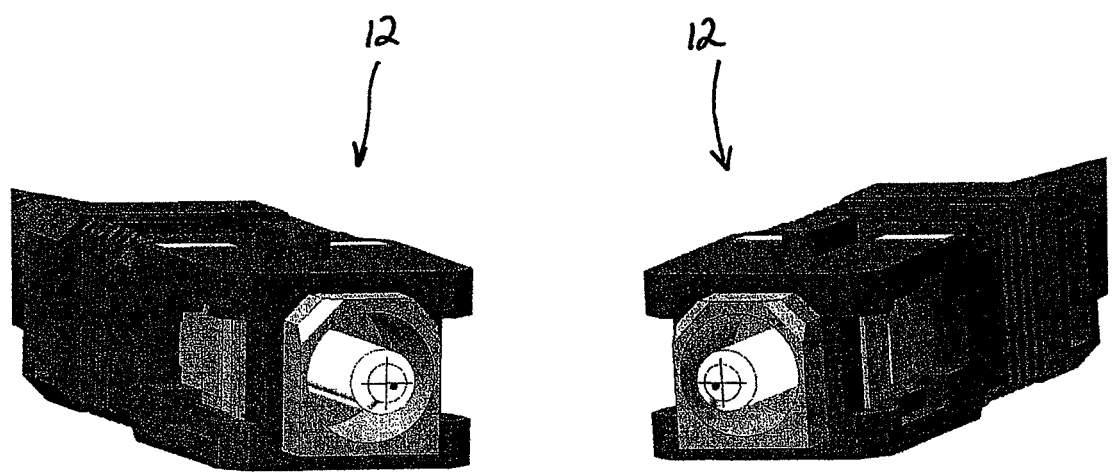
FIG. 6 shows matching fiber positions in a pair of connector plugs according to another exemplary embodiment of the present invention.

FIG. 6 shows matching fiber positions in a pair of connector plugs 12, with the keys of both connectors facing up. As shown in FIG. 6, the optical fibers 4 (see also FIG. 2) of each connector plug 12 are in alignment with each other in a matching configuration. The positions of the optical fibers 4 shown in FIG. 6 have a different fiber position that the optical fibers 4 shown in FIGS. 4 and 5.

Exemplary embodiments of the present invention use a single design for a connector plug housing, a single design for an adapter and a single design for a connector plug ferrule. Accordingly, the need to have different connector housings with different physical barriers to prevent either unauthorized insertion of a connector plug into the receptacle of an adapter or unauthorized removal of a connector plug from an adapter can be eliminated. That is, a common connector housing can be used for all connector plugs. In addition, one common adapter may be used to connect the connector plugs.

Identification of connector plugs with specific fiber positioning can be carried out through color-coding the components of the connector plugs, such as plug housings or connector plug boots. Identification of connector plugs with specific fiber positioning can also be carried out through number coding of the cable assemblies, or other types of marking.

Accordingly, the exemplary embodiments uses a single fiber hole in each ferrule of a connector to achieve physical security in the connecting system of a network. By choosing different discrete positions of a single-fiber ferrule, proper connection can only be made if the mating pair of connectors both have fibers in a position that complements each other.

Although a few exemplary embodiments have been shown and described, it will be appreciated by those skilled in the art that changes may be made in these exemplary embodiments without departing from the principles and spirit of the invention, the scope of which is defined in the appended claims and their equivalents. For example, although the above exemplary embodiments utilize optical fibers, non-optical fibers could also be used without departing from the principles and spirit of the invention.

What is claimed is:

1. A single-fiber connector comprising:
    a housing; and
    a single-position ferrule configured to receive only one fiber and which is disposed within the housing, the single-position ferrule including a single fiber hole which extends though the housing parallel to a longitudinal center axis of the ferrule and is configured to receive the fiber,
    wherein:
        the fiber hole is disposed in the ferrule at a fiber position located according to a predetermined distance offset from the longitudinal center axis of the ferrule and a rotation of a predetermined number of degrees relative to a fixed point of the housing around the longitudinal center axis of the ferrule in a predetermined direction such that only connectors having a matching mating position can form a connection with the single-fiber connector;
        the ferrule is rotationally fixed in the housing;
        the fixed point of the housing includes a key or a side of the housing;
        the predetermined distance offset from the longitudinal center axis of the ferrule is greater than or equal to a radius of the fiber; and
        the fiber is an optical fiber.

2. The single-fiber connector of claim 1, wherein the predetermined direction is one of clockwise and counterclockwise.

3. The single-fiber connector of claim 1, wherein the housing includes the key and the predetermined direction is relative to the key.

4. The single-fiber connector of claim 1, wherein the ferrule has a cylindrical shape.

5. The single-fiber connector of claim 1, further comprising the optical fiber disposed within the fiber hole.

6. A single-fiber connector system comprising:
    a first single-fiber connector which comprises:
    a first housing; and
    a first single-position ferrule configured to receive only one fiber and which is disposed within the first housing, the first single-position ferrule including a first single fiber hole which extends though the first housing parallel to a longitudinal center axis of the first ferrule and is configured to receive a first fiber,
    wherein the first fiber hole is disposed in the first ferrule at a first fiber position located according to a predetermined distance offset from the longitudinal center axis of the first ferrule and a rotation of a predetermined number of degrees relative to a fixed point of the first housing around the longitudinal center axis of the first ferrule in a predetermined direction such that only connectors having a matching mating position can form a connection with the first single-fiber connector; and
    a second single-fiber connector which comprises:
    a second housing; and
    a second single-position ferrule configured to receive only one fiber and which is disposed within the second housing, the second single-position ferrule including a second single fiber hole which extends though the second housing parallel to a longitudinal center axis of the second ferrule and is configured to receive a second fiber,
    wherein the second fiber hole of the second single-fiber connector is disposed in the second ferrule at a second fiber position located to have a mating fiber position which matches in alignment with the first fiber position of the first fiber hole of the first single-fiber connector;

wherein the first ferrule is rotationally fixed in the first housing;

wherein the fixed point of the first housing includes a key or a side of the first housing;

wherein the predetermined distance offset from the longitudinal center axis of the first ferrule is greater than or equal to a radius of the first fiber; and wherein the first fiber and the second fiber are optical fibers.

7. The single-fiber connector of claim 5, wherein the fiber is fixed in the ferrule.

8. The single-fiber connector system of claim 6, further comprising the first fiber disposed within the first fiber hole and the second fiber disposed within the second fiber hole.

9. The single-fiber connector system of claim 8, further comprising:

an adapter which comprises a first receptacle configured to receive the first single-fiber connector and a second receptacle configured to receive the second single-fiber connector, wherein the first fiber position of the first fiber hole and the second fiber position of the second fiber hole are located such that the first fiber and the second fiber mate in coaxial alignment with each other to effect an interconnection.

10. The single-fiber connector system of claim 9, wherein the first housing includes the key and the second housing includes a key, and each key of the first housing and the second housing is received by a key hole of the adapter.

11. The single-fiber connector system of claim 6, wherein the predetermined direction is one of clockwise and counterclockwise.

12. The single-fiber connector system of claim 6, wherein the first ferrule and the second ferrule both have a cylindrical shape.

13. The single-fiber connector system of claim 8, wherein the first fiber is fixed in the first ferrule and the second fiber is fixed in the second ferrule.

14. A method of connecting single-fiber connectors in a secure fiber optic network, the method comprising:

selecting a first fiber position for a first fiber hole in a first ferrule of a first single-fiber connector, the first ferrule disposed within a first connector housing, to provide a first fiber, the first fiber position being selected relative to a position of a first key of the first connector housing and is located off-center from a center of the first ferrule by a distance greater than or equal to a radius of the first fiber such that only connectors having a matching mating position can form a connection with the first single-fiber connector; wherein the first ferrule is rotationally fixed in the first connector housing;

selecting a second fiber position in a second ferrule of a second single-fiber connector, the second ferrule disposed within a second connector housing, to provide a second fiber, the second fiber position being selected relative to a position of a second key of the second connector housing and is located off-center from a center of the second ferrule by a distance greater than or equal to a radius of the second fiber;

inserting a first fiber into the first fiber hole of the first single-fiber connector; and inserting a second fiber into the second fiber hole of the second single-fiber connector, wherein the second fiber position has a matching position with the first fiber position when the first ferrule and the second ferrule are aligned in a mating configuration such that the first fiber and the second fiber are in coaxial alignment with one another; and wherein the first fiber and the second fiber are optical fibers.

15. The method of connecting single-fiber connectors of claim 14, wherein the first fiber position is located off-center from the center of the first ferrule having a fiber offset from the center of the first ferrule and having a degree of rotation in a predetermined direction relative to the first key.

16. The method of connecting single-fiber connectors of claim 14, wherein the first ferrule and the second ferrule both have a substantially cylindrical cross-section.

17. The method of connecting single-fiber connectors of claim 14, the method further comprising:

inserting the first single-fiber connector into a first receptacle of an adapter; and inserting the second single-fiber connector into a second receptacle of the adapter such that the first fiber and the second fiber mate in coaxial alignment to effect an interconnection.

18. The method of connecting single-fiber connectors of claim 14, further comprising fixing the first fiber in the first ferrule and fixing the second fiber in the second ferrule.

* * * * *